No. 703,109. Patented June 24, 1902.
R. BARR.
COMBINATION MEASURING INSTRUMENT.
(Application filed Feb. 15, 1900. Renewed May 2, 1902.)
(No Model.) 3 Sheets—Sheet 1.
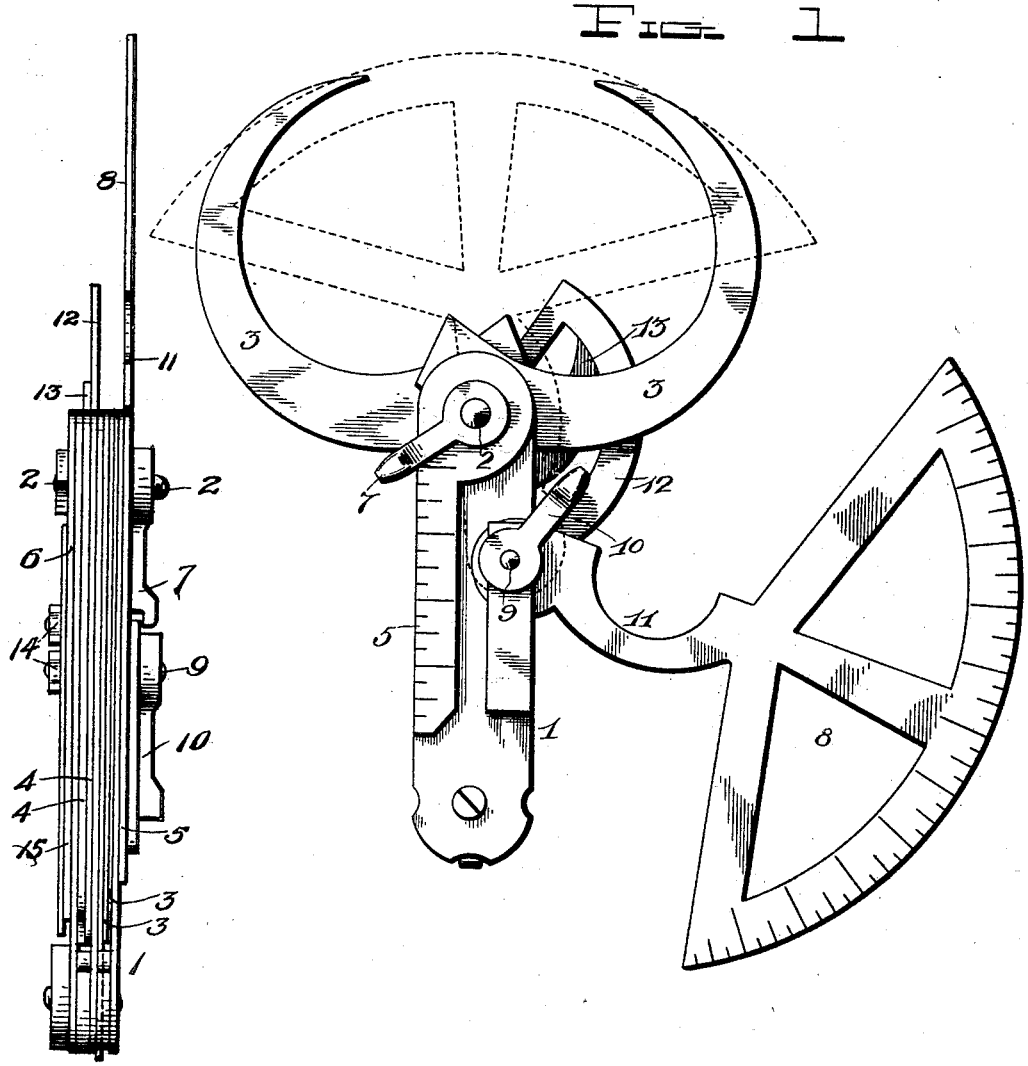

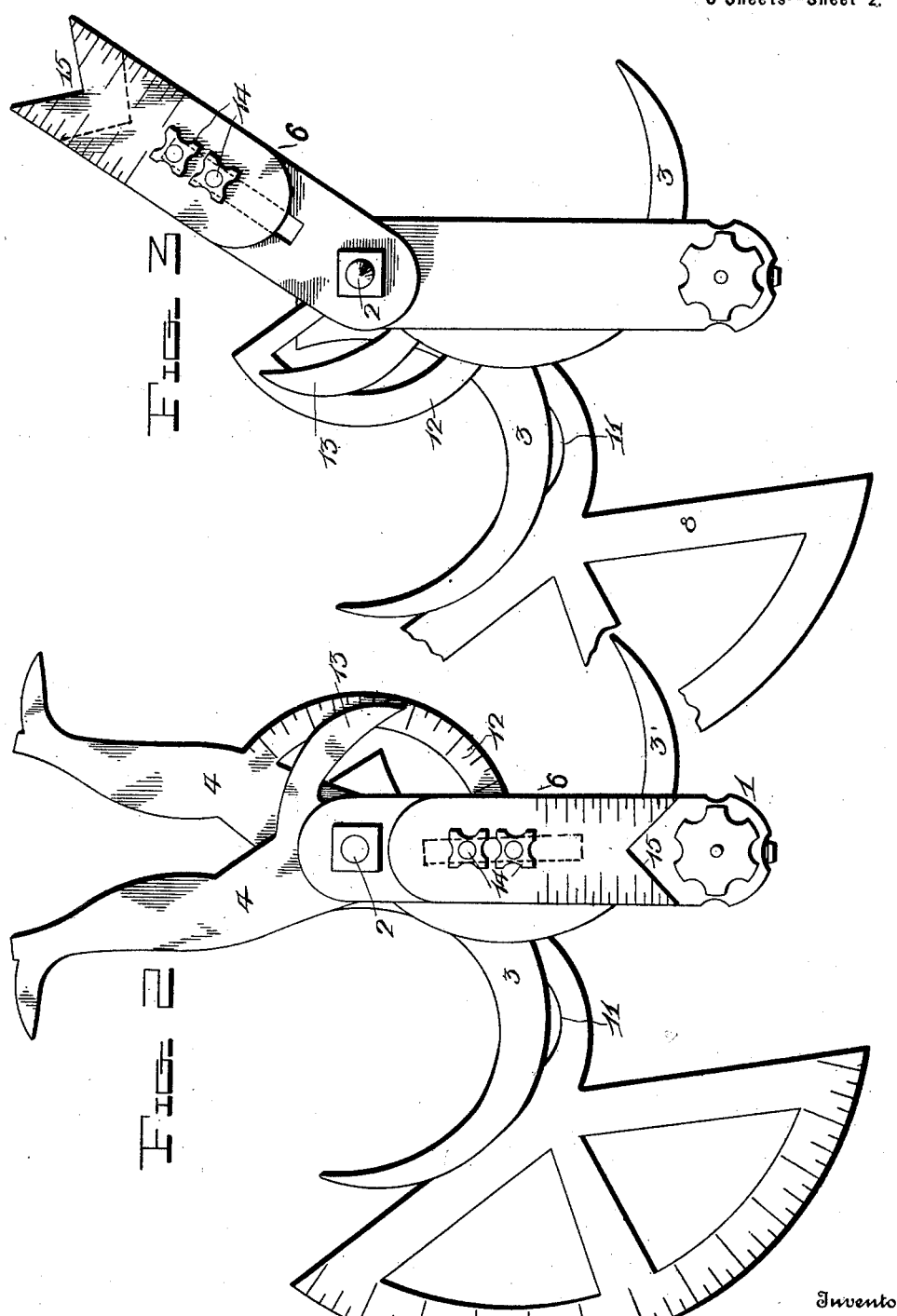

No. 703,109. Patented June 24, 1902.
R. BARR.
COMBINATION MEASURING INSTRUMENT.
(Application filed Feb. 15, 1900. Renewed May 2, 1902.)
(No Model.)
3 Sheets—Sheet 3.
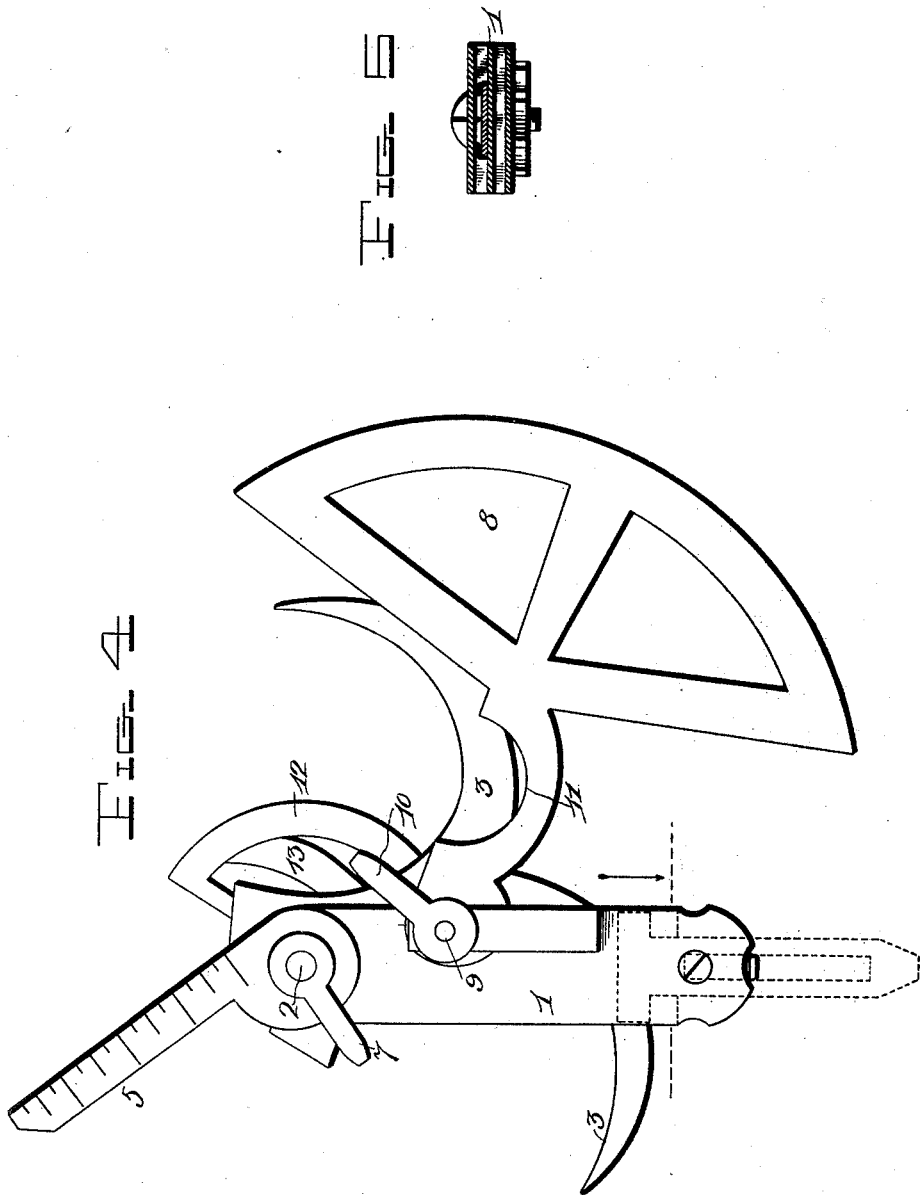

UNITED STATES PATENT OFFICE.

RICHARD BARR, OF RAVINE, PENNSYLVANIA.

COMBINATION MEASURING INSTRUMENT.

SPECIFICATION forming part of Letters Patent No. 703,109, dated June 24, 1902.

Application filed February 15, 1900. Renewed May 2, 1902. Serial No. 105,682. (No model.)

*To all whom it may concern:*

Be it known that I, RICHARD BARR, a citizen of the United States, residing at Ravine, in the county of Schuylkill and State of Pennsylvania, have invented certain new and useful Improvements in Combination Measuring Instruments; and I do declare the following to be a full, clear, and exact description of the invention, such as will enable others skilled in the art to which it appertains to make and use the same.

The invention relates to a combination measuring instrument; and it has for its object to provide an instrument of this character by means of which the outside and inside diameters of a hollow body may be accurately ascertained, the depth of a hole measured, and the depth of a kerf or slot in a bar be measured and squared.

To this end the invention consists in certain features of construction and combination of parts, which will be hereinafter fully described and claimed.

In the accompanying drawings, Figure 1 is a side elevation of the device, showing the outside caliper-legs in position for measuring the outside diameter of a hollow body, the gage being shown in full lines swung down to permit of a free movement of the caliper-legs and in dotted lines swung up, so that the distance between the points of the caliper-legs may be ascertained. Fig. 2 is a similar view taken from the opposite side and showing the inside caliper-legs in position to take the inside diameter of a hollow body. Fig. 3 is a view of the instrument when both sets of caliper-legs are closed within the handle and the tool used for taking the depth of and squaring a notch in a bar. Fig. 4 is a view of the device when used as a depth-gage and showing in dotted lines the screw-driver extended to its full length and ready to be used. Fig. 5 is a cross-sectional view through that end of the handle to which the screw-driver is secured. Fig. 6 is a side view of the device, showing the parts folded into a compact compass.

In the drawings the same reference characters indicate the same parts of the invention.

1 denotes the handle of the tool or instrument, which has extending transversely through its upper end a pivot-bolt 2. Pivoted to this bolt are the outside caliper-legs 3, which are of the usual construction. The inside caliper-legs 4 are also pivoted to this bolt, as are also the depth-gage 5 and the combined slot depth-gage and square 6.

7 denotes a set-nut screwed upon the end of said pivot-bolt, so that the parts pivoted to said bolt may be clamped in position for use when desired.

8 denotes a graduated segmental bar, the shank of which is pivoted to the side of the casing or handle upon a pivot-bolt 9, which is engaged by a set-nut 10 for clamping the graduated segment-bar in position. The shank of the segment-bar is provided with a semicircular recess 11 to engage the curved pivoted end of the depth square to insure a neat fit, as shown in dotted lines, Fig. 1.

One of the legs of the inside calipers is provided with a segmental scale 12, while the other leg is provided with an indicator-point 13, which, working in conjunction with the scale, indicates to the operator the exact inside diameter of a hollow body.

In the operation of the device should it be desired to ascertain the outside diameter of a body the various parts of the device are moved to the position shown in Fig. 1, and the caliper-legs are spread apart so that their points will engage the greatest diameter of the body. The set-nut 7 is now set to hold the caliper-legs in their adjusted position. The device is now removed from the measured body, and the segmental graduated bar is now swung up from the position shown in full lines, Fig. 1, to that shown in dotted lines, so that the distance between the points of the caliper-legs may be accurately measured.

When it is desired to ascertain the inside diameter of a hollow body, the parts of the tool are shifted to the position shown in Fig. 2, and when the points of the caliper-legs have been adjusted to the inner walls of said body the indicator-point on one of the legs will indicate upon the scale of the other leg the exact inside diameter of said body.

When it is desired to take the depth and also ascertain if a kerf or notch in a bar or other object is square I use the combined depth-gage and square 6. This square, as before stated, is pivoted upon the bolt 2 and consists of two parts, one having a sliding engagement with respect to the other and one graduated. These parts are locked in adjustment by bolts and nuts 14. The lower end of both of these parts is provided with a squaring-notch 15. In using this square one of the parts is placed upon the surface of the notched bar, and the other part is lowered into the notch in said bar. The operator then not only ascertains if the notch in said bar is square, but also obtains the exact depth of the notch.

In Fig. 4 I have shown the depth-gage extended. This gage is for the purpose of ascertaining the depth of a hole. In said figure I have also shown in dotted lines the screwdriver extended its full length and capable of use as occasion may require.

From the foregoing description, taken in connection with the accompanying drawings, the construction, operation, and advantages of my device will be readily apparent without requiring an extended explanation. It will be seen that the instrument is simple of construction, that said construction permits of its manufacture at a comparatively small cost, and that it is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

In a measuring instrument, the combination with the handle; of outside caliper-legs pivoted at one end thereof and adapted to be folded within the handle, and a segmental scale pivoted below said caliper-legs and adapted to be swung in such position that the distance between the points of said caliper-legs may be determined, as set forth.

In testimony whereof I have hereunto set my hand in presence of two subscribing witnesses.

RICHARD BARR.

Witnesses:
 MILTON MOORE,
 O. E. HUMMEL.